F. CHAMBERLIN.
Seed-Dropper.
No. 313. A. I. Patented Feb 26, 1861.
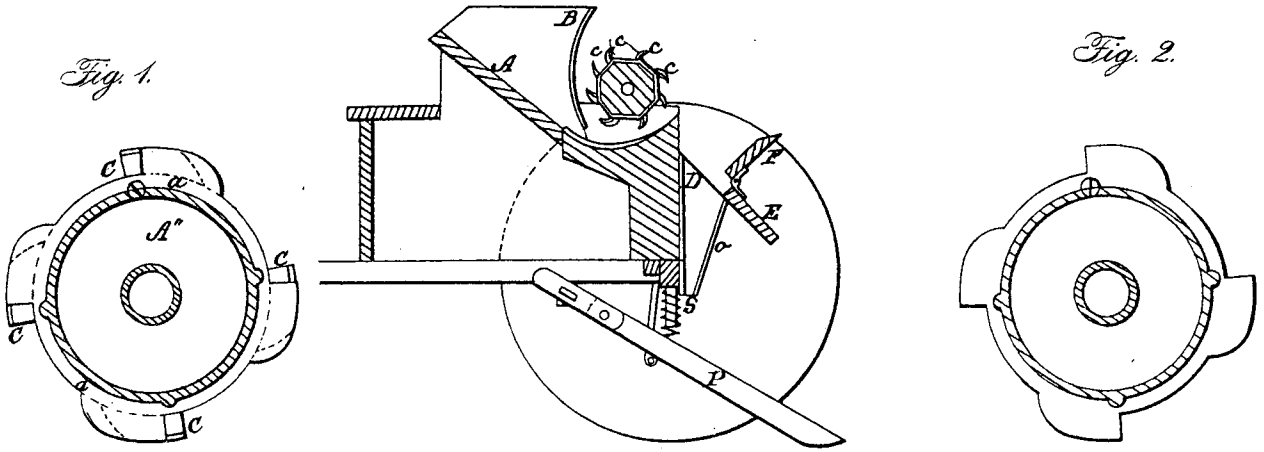
Witnesses:
a. a. Yeatman
Inventor:
F Chamberlin
per C M Alexander Atty
A.M. PHOTO-LITHO. CO. N.Y. (OSBORNE'S PROCESS.)

Bibliography